W. GARRARD.
COOLER FOR PRESERVING BUTTER, MILK, AND OTHER ARTICLES.
No. 59,993. Patented Nov. 27, 1866.
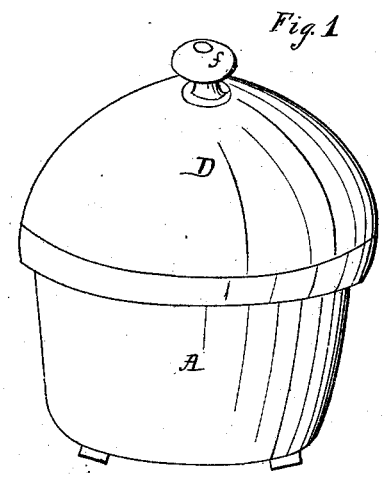
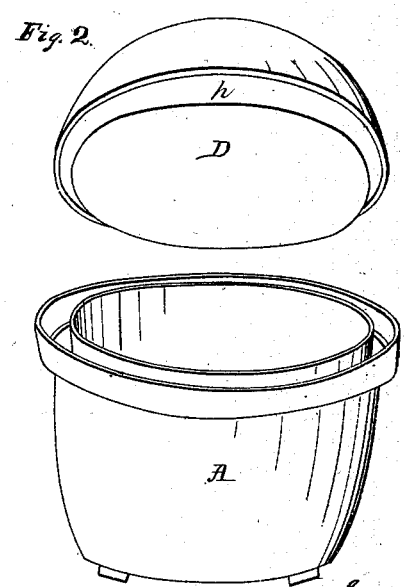
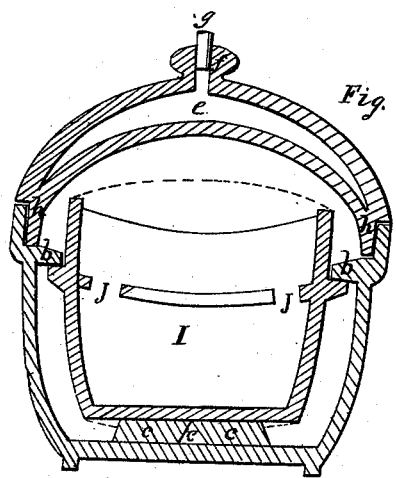
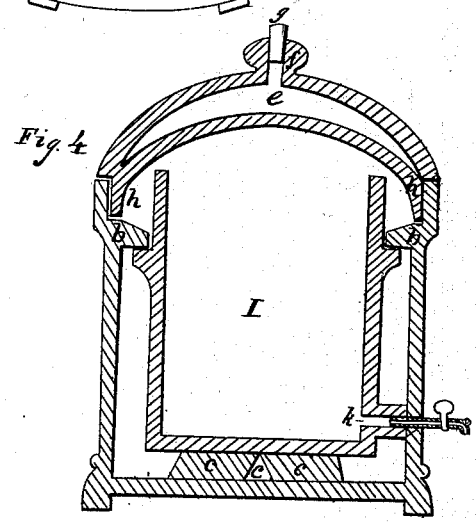
Witnesses:
Inventor:

United States Patent Office.

IMPROVED COOLER FOR PRESERVING BUTTER, MILK, AND OTHER ARTICLES.

WILLIAM GARRARD, OF FALLSTON, PENNSYLVANIA.

Letters Patent No. 59,993, dated November 27, 1866; antedated November 23, 1866.

SPECIFICATION.

TO ALL WHOM IT MAY CONCERN:

Be it known that I, WILLIAM GARRARD, of Fallston, in the county of Beaver, in the State of Pennsylvania, have invented a new and useful improvement on a Cooler, by gaining a more perfect evaporation, by which butter, milk, meat, and water, &c., can be kept perfectly cool and sweet; and I do hereby declare that the following is a full, clear, and exact description of the construction and operation of the same, reference being had to the annexed drawings making a part of this specification, in which—

Figure 1 is a perspective view.
Figure 2, a sectional view.
Figure 3, a transverse section; and
Figure 4, water cooler with faucet.

The nature of my improvement consists in making a vessel of any kind of unglazed pottery ware, and of any size or shape to contain water, as follows:

The vessel, A, to be made with feet, that the air may pass freely under it, and to be fitted with three studs, $b\ b\ b$, on the inside at equal distances apart and near the shoulder of the rim of vessel A; also three risers or brackets, $c\ c\ c$, fitted on the inside of the bottom and diverging from the centre of vessel A. The vessel, A, is fitted with a lid, D, and so constructed as to form a water chamber, $e$, with a neck, $f$, to serve the double purpose of handle, and mouth to put the water in chamber $e$, and made air-tight by a cork, $g$. The lid, D, to be fitted into the vessel, A, by a flange or lip, $h$, which makes an air-tight joint by dipping into the water contained in the vessel A, around the following vessel, I. There is also a smaller vessel, I, to be glazed or unglazed, or glazed in the inside only, which I prefer; the vessel to be of any shape or size to suit, and to be placed in the vessel A. The vessel, I, to be made with a flange projecting on the outside, with three openings, $j\ j\ j$, the openings being made to let the flange of vessel I pass under the studs, $b\ b\ b$, of vessel A, for the purpose of keeping the vessel I firm on the risers or brackets $c\ c\ c$, of vessel A; the vessel I to be the receptacle of the articles to be kept cool. For a water-cooler I add a faucet, $k$, through vessel A into vessel I, and near the bottom, to draw the water from vessel I, as shown in fig. 4.

I do not claim simply a cooler made of unglazed pottery ware, whether to contain water or not, for such have been used; but what I do claim as my improvement, and desire to secure by Letters Patent, is—

A cooler made of any kind of unglazed pottery ware of any size or shape, and so constructed that the articles to be kept cool are in a vessel entirely surrounded by water, and therefore air-tight, and made to combine all the advantages of a more perfect evaporation for the purposes intended, as is herein substantially described and set forth.

WM. GARRARD.

Witnesses:
MILO A. TOWNSEND,
THOMAS ELVERSON.